United States Patent [19]

Nakashima et al.

[11] Patent Number: 4,749,269
[45] Date of Patent: Jun. 7, 1988

[54] LENS DRIVE DEVICE

[75] Inventors: Shigeo Nakashima; Ryoichi Hanamori; Hiroshi Yamamoto, all of Kanagawa, Japan

[73] Assignees: Canon Kabushiki Kaisha; Canon Seiki Kabushiki Kaisha, both of Tokyo, Japan

[21] Appl. No.: 893,102

[22] Filed: Aug. 4, 1986

[30] Foreign Application Priority Data

Aug. 5, 1985 [JP] Japan .................... 60-119382[U]
Aug. 5, 1985 [JP] Japan .................... 60-119383

[51] Int. Cl.⁴ .................... G02B 7/04; G03B 3/00
[52] U.S. Cl. .................... 350/429; 350/255; 354/400
[58] Field of Search .................... 350/429, 430, 255; 354/400

[56] References Cited

U.S. PATENT DOCUMENTS

| 4,152,060 | 5/1979 | Specht | 254/195 |
| 4,519,691 | 5/1985 | Yamada et al. | 354/400 |
| 4,534,624 | 8/1985 | Toda et al. | 350/429 |
| 4,605,286 | 8/1986 | Sumi | 350/429 |
| 4,626,077 | 12/1986 | Yamamoto | 350/429 |

FOREIGN PATENT DOCUMENTS

| 56-147132 | 11/1981 | Japan . |
| 57-20710 | 2/1982 | Japan . |
| 59-116627 | 7/1984 | Japan . |
| 59-116628 | 7/1984 | Japan . |
| 59-175368 | 10/1984 | Japan . |

Primary Examiner—John K. Corbin
Assistant Examiner—Loha Ben
Attorney, Agent, or Firm—Fitzpatrick, Cella, Harper & Scinto

[57] ABSTRACT

A lens drive device of the invention is disclosed comprising a motor drive for each lens of zoom means and focusing means, whereby a motor is made to have a concentric layer structure about a photographic optical axis, and a single magnetic circuit for the motor having the aforesaid layer structure is formed by a single permanent magnet.

4 Claims, 4 Drawing Sheets

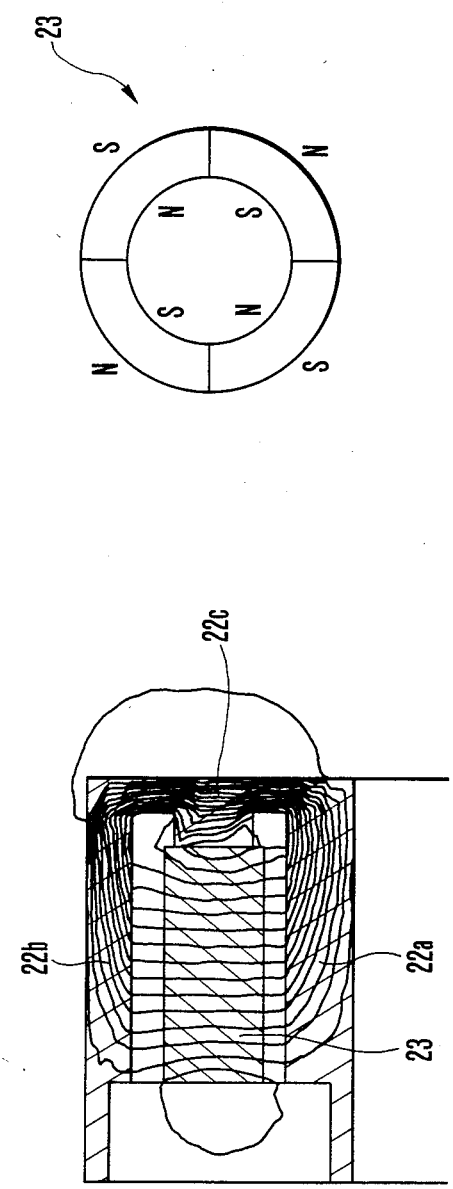

LENS DRIVE DEVICE

BACKGROUND OF THE INVENTION

1. Field of the Invention

This invention relates to lens drive devices and more particularly to a device for driving zoom lens and focusing lens by a motor.

2. Description of the Related Art

There have been previous proposals for driving an optical element, for example, a focusing lens in a lens barrel by a motor, as, for example, disclosed in U.S. Pat. No. 4,152,060 and Japanese Laid-Open Patent Application Nos. Sho 56-147132, Sho 57-20710, Sho 59-116627 and Sho 59-116628 . The motor shown in the above-cited documents has as its constituent parts a rotor and stator formed in a hollow shape. The hollow stator provides a space through which light coming from an object can be photographed or provides a space housing a lens system.

By the way, the lens barrels, particularly zoom lens barrels, have two lens systems, namely, a zoom lens system movable for zooming, and a focusing lens system movable for focusing. Accordingly, when the zooming and the focusing are motorized, it is required to use two independent motors. If it is desired to arrange these two motors in a lens barrel, the complexity of the structure and the size of the lens mounting mechanism are increased.

In the field of motors, a so-called double cup type motor has been proposed in Japanese Laid-Open Patent Application No. Sho 59-175368. The motor of this type includes a frame, a field magnet of a first motor arranged on the inside of the frame, a cup-shaped rotor of the first motor arranged in the field magnet with a gap held therebetween, a fixed iron core of the first motor arranged in the cup-shaped rotor with an air gap therebetween, a field magnet of a second motor arranged inside of the fixed core of the first motor through an intermediary of non-magnetic material, a second cup-shaped rotor arranged with a gap from the field magnet, and a fixed iron core of the second motor arranged inside of the cup-shaped rotor with an air gap therebetween, wherein the aforesaid first and second cup-shaped rotors are fixedly secured to first and second output shafts respectively, and the first and second output shafts are arranged on a common axis to the left and right of the frame.

SUMMARY OF THE INVENTION

An object of the present invention is to provide a lens drive device for driving a zoom lens and a focusing lens by a motor having a single structure.

Another object is to provide a lens drive device which enables a simplification of the lens mounting mechanism to be achieved when it is built in a lens barrel.

BRIEF DESCRIPTION OF THE DRAWINGS

FIG. 4 is a schematic view illustrating magnetic lines of force in the motor.

FIG. 5 is a cross-sectional view of the permanent magnet 23.

DETAILED DESCRIPTION OF THE PREFERRED EMBODIMENT

Figure 1:
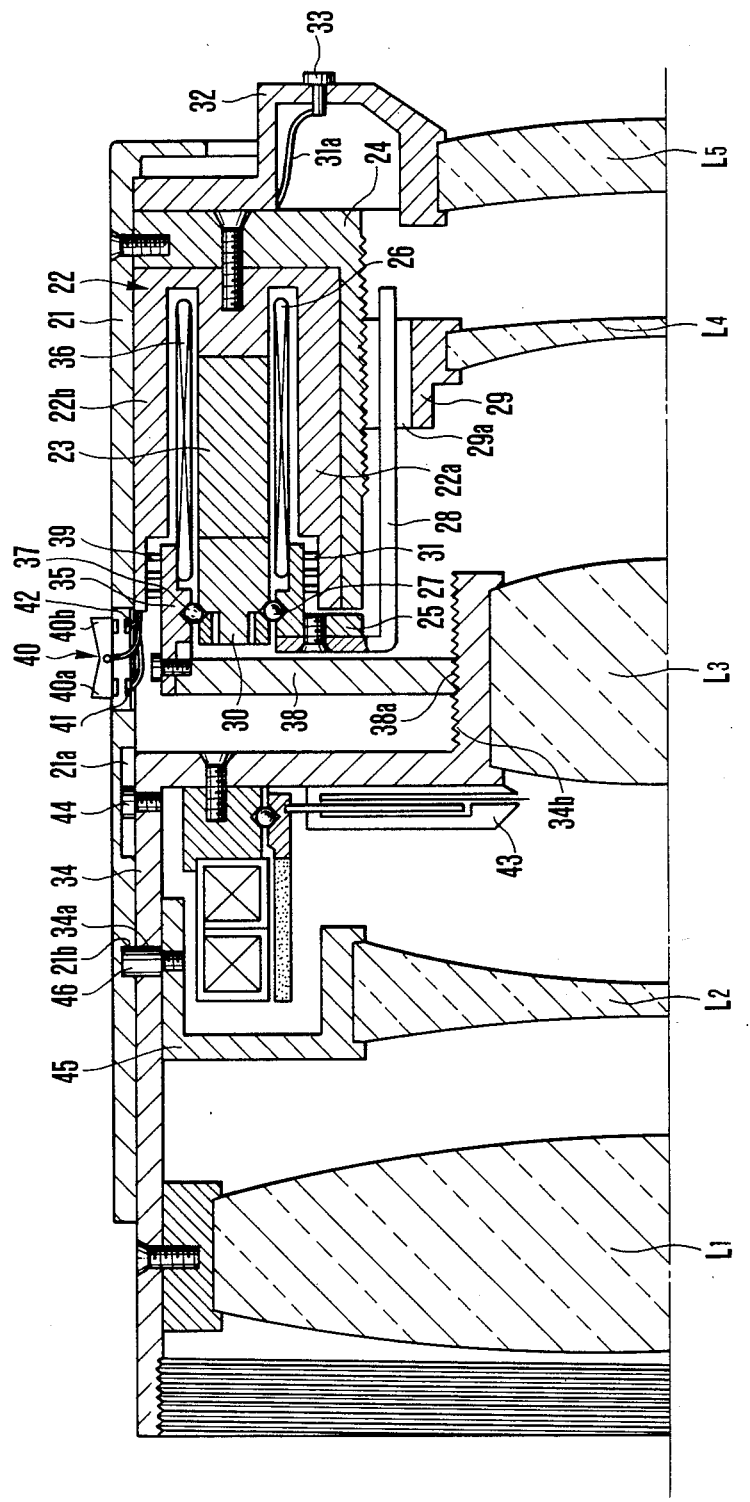
FIG. 1 is a longitudinal section view of the upper half of the main parts of an embodiment of the lens drive mechanism in a zoom lens barrel according to the present invention.
Figure 2:
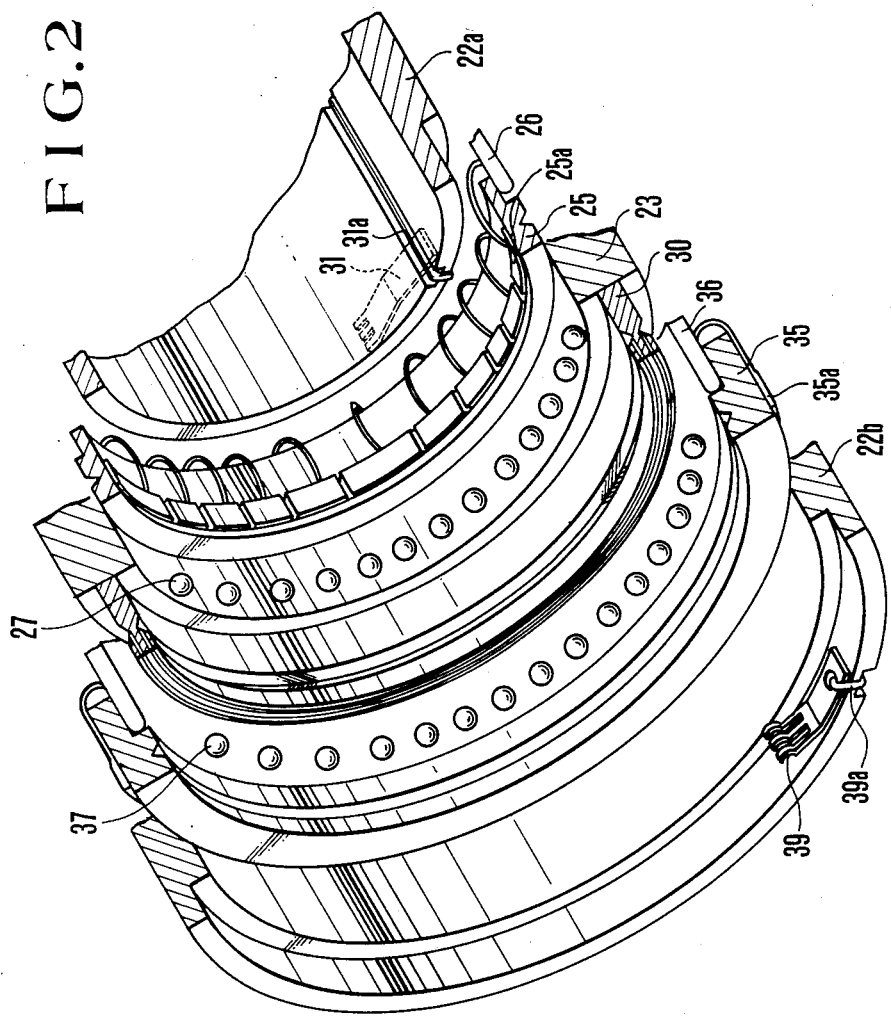
FIG. 2 is a fragmentary exploded perspective view of the coreless motor of FIG. 1.

An embodiment of the present invention is described by reference to FIGS. 1 to 5.

Fitted in the inner diameter of the rear part of a fixed tube 21 is a yoke 22 constituting a coreless motor body of hollow cylindrical shape and comprised of an inner yoke portion 22a and an outer yoke portion 22b. The yoke 22 is fixedly supported by a helicoid sleeve 24 by screw fasteners, and this sleeve is in turn fixedly fitted in the rear end of the fixed tube 21. An inner rotor 25 having a coil 26 and an outer rotor 35 having a coil 36 are concentrically arranged between the inner and outer yoke portions 22a and 22b. A magnet 23 intervenes between the coils 26 and 36 and is fixedly supported on the yoke 22 at an intermediate portion thereof to form a magnetic circuit. Its magnetic lines of force flow through cross-sections perpendicular to the optical axis of the device and also through the sections including the optical axis. These two components are combined to form a magnetic field. The inner rotor 25 and the outer rotor 35 are rotatably supported on a bearing portion of the magnet 23 through balls 27 and balls 37, respectively.

FIG. 4 shows the flow of the magnetic lines of force along a magnetic path formed by the inner yoke portion 22a, outer yoke portion 22b, fixed yoke portion 22c and permanent magnet 23. FIG. 5 shows the cross-section of the permanent magnet 23.

A rotation transmitting key 28 parallel to the optical axis of the device is fixedly mounted to the inner rotor 25. This key 28 slidably engages in a straight groove formed in a focusing lens holding tube 29 which holds a focusing lens L4 and which is in helicoidal engagement with the above-mentioned helicoid sleeve 24. A commutator 25a on the inner surface of the inner rotor 25 is in contact with a brush 31 on the outer surface of the inner yoke 22a. This brush 31 is electrically connected through a lead wire 31a in a groove formed in the inner surface of the inner yoke portion 22a to an interconnection terminal 33 provided in an end wall of a relay-lens holding barrel 32 for holding a relay lens L5 which is fixedly supported in the inner diameter of the fixed tube 21 at the rear end thereof. Thus the inner coil 26 is supplied with current from a power source in the camera body.

A rotary member 38 of annular shape and extending perpendicular to the optical axis is fixedly mounted to the outer rotor 35, and its inner surface has a screw-thread 38a in mesh with a screw-thread 34b in the outer surface of a zoom sleeve 34. A commutator 35a on the outer surface of the rotor 35 is in contact with a brush 39 on the inner surface of the outer yoke portion 22b. This brush 39 is electrically connected through a lead wire 39a in a groove formed in the outer surface of the outer yoke portion 22b to contacts 41 and 42 of a zoom control switch 40 on the outer surface of the fixed tube 21 and therefrom to the aforesaid interconnection terminal 33 so that the outer coil 36 is supplied with current from the power source in the camera body.

The aforesaid zoom sleeve 34 is slidably fitted in the inner diameter of the fixed tube 21 and fixedly carries two zoom lenses L1 and L3 and a diaphragm device 43.

A roller 44 on the outer surface of the zoom sleeve 34 is in engagement with a cam groove 21a formed in fixed tube 21. A lens holding tube 45 which holds a compensator lens L2 positioned between the zoom lenses L1 and L3 is fitted in the inside of said zoom sleeve 34. A roller 46 threadedly held on the outer surface of lens holding tube 45 extends through a cam groove 34a formed in the zoom sleeve 34 and comes into engagement with a cam groove 21b formed in the inner surface of the fixed tube 21.

Figure 3:
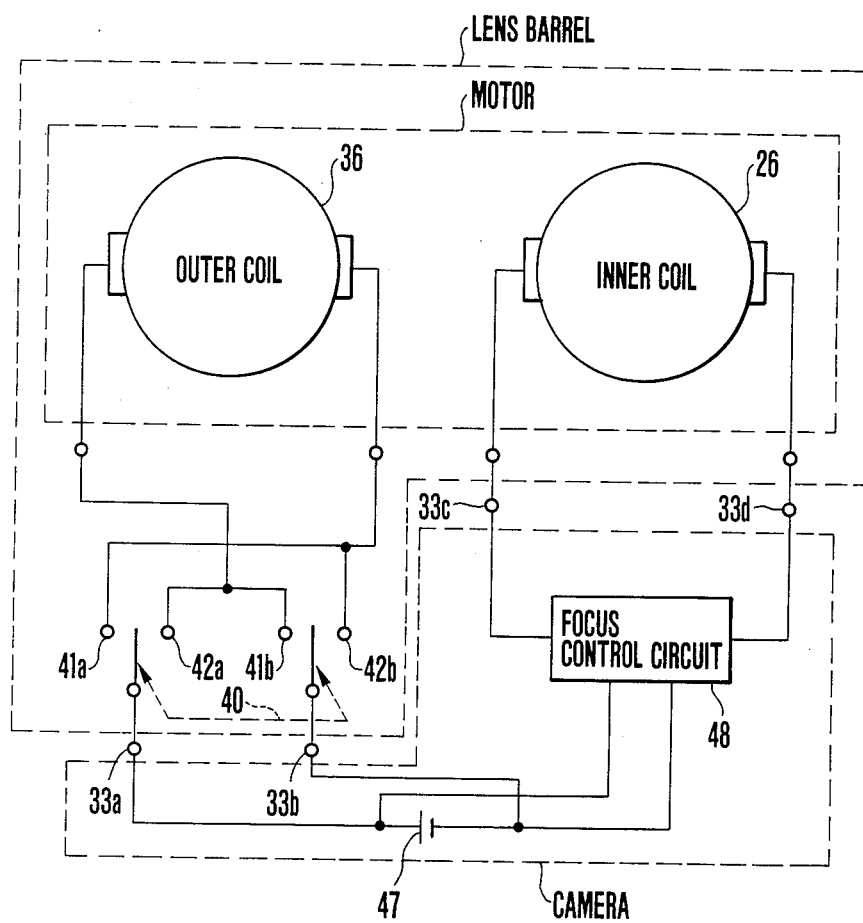
FIG. 3 is an electrrcal circuit diagram of the motor.

The zoom control switch 40 has a tumbler type change-over switch, which is so arranged that when it is pushed down at one end 40a (for telephoto), the switch 40 closes its contact 41, and when it is pushed at the other end 40b (for wide angle) it closes its contact 42. The contacts 41 and 42 each comprise a pair of contact elements 41a, 41b, and 42a, 42b. As shown in FIG. 3, the contacts 41a and 42b are connected to one end of the coil 36, and the contacts 41b and 42a are connected to the other end of the coil 36. Movable contacts for the paire contacts 41a, 42a, and 41b, 42b of the switch 40 are connected respectively through interconnection elements 33a and 33b to the positive and negative terminal of the power source 47 in the camera body.

The inner coil 26 is connected, at both its terminals, through interconnection elements 33c and 33d to a focus control circuit 48 connected to the power source 47 in the camera body.

In the zooming operation, when the telephoto control end 40a of the zoom control switch 40 is pushed down, the contacts 41 are connected through the interconnection elements 33a and 33b to the power source 47 in the camera body, so that the outer coil 36 is supplied with current through the brush 39. And, since the yoke 22, magnet 23 and coil 36 constitute an outer coreless motor, as publicly known in the art, the magnetic field crossing the coil 36 and the current flowing through the coil 36 interact according to Fleming's left hand law, producing a torque in the circumferential direction of the coil 36. Therefore, the rotor 35 rotates along with the coil 36, and the rotary member 38 fixedly connected to the rotor 35 rotates. Then, the zoom sleeve 34, which is in threaded engagement with rotary member 38, is moved to the telephoto side along the cam groove 21a because its roller 44 engages in the cam groove 21a of the fixed tube 21. Furthermore, as the zoom sleeve 34 is moved, the lens holding tube 45, which is held in camming engagement with the cam groove 34a and the cam groove 21b of the fixed tube 21 by means of the roller 46, is also moved, whereby the zooming operation toward the telephoto side. is effected.

Conversely when the other end 40b of the zoom control switch 40 is pushed down, the contacts 42 are rendered effective, changing the direction of current flow through the outer coil 36. Therefore, the zoom sleeve 34 is driven to move in the reverse direction to effect zooming operation toward the wide angle side.

Next, a focusing control circuit 48 in the camera body supplies focusing control signals to other elements 33c and 33d of the interconnector 33 and therefrom through the brush 31 to the inner coil 26. Since the yoke 22, magnet 23 and coil 26 constitute an inner coreless motor, as publicly known in the art, the magnetic field crossing the coil 26 and the current flowing through the coil 26 interact to exert a torque in the circumferential direction of the coil 26 according to the Fleming's left hand law. The rotor 25 rotates along with the coil 26 an the rotation transmitting key 28 fixedly mounted to the rotor 25 rotates. So, the focus lens holding tube 29, which is in fitting engagement with said key 28, rotates and the tube 29 is axially moved by the helicoid-threaded connection to the helicoid sleeve 24. Thus, the focusing lens L4 is axially moved along the optical axis to effect focusing.

By the way, it is well known in the art that as the diameter of the coreless motor is decreased, the rotation speed is increased while the torque is decreased and the inertia is decreased. Compared with the outer coil 36, the inner coil 26, because of its diameter being smaller, has a faster rotation and a lower torque, and is easy to control. Therefore, the use of the inner coil 26 in operating the focusing mechanism of small load enables the focusing to be controlled with ease.

The outer coil 36 has, on the other hand, because of its diameter being larger, a higher torque and a slower rotation. But, the zoom sleeve 34 is larger in size than the focusing lens holding tube 29, and the sum of the weights of the zoom lens is far heavier than the focusing component. So, the power required for zooming operation is necessarily far larger than that required for focusing operation. Under such circumstances, the outer coil 36 is used to effect zooming operation. But, the torque of the outer coil 36 is too weak to directly drive axial movement of the zoom sleeve 34 by rotation of the outer coil. For this reason, use is made of an intermediary in the form of an annular rotary member 38 whose inner surface is screw-threaded and the zoom sleeve 34 is screw-threadedly connected to the rotary member 38. If, in this case, the lead of the screw thread is small, the small torque translater to a large power in the axial direction. For this reason, the lead of the screw thread of the drive connection between the rotary member 38 and the zoom sleeve 34 is made so small that the torque of the outer coil 36 becomes sufficient to operate the zooming.

As has been described above, according to the present invention, two coreless motors are concentrically formed by inner and outer coils within the zoom lens barrel, so that the inner coreless motor is used to operate focusing, and the outer coreless motor to operate zooming, with an advantage that the camera can be managed stably and easily.

Another advantage arising from the use of the screw-threaded drive connection between the outer coreless motor and the zoom sleeve is that even when the lens barrel is pointed upward or downward, the zoom sleeve is prevented from moving at hazard by its own weight.

In particular, the present invention is to make use of only one permanent magnet 23 between the inner yoke portion 22a and the outer yoke portion 22b so that the one magnetic circuit suffices for controlling the rotation of either of the field coil for the zoom lens and the field coil for the focusing lens, thereby giving an additional advantage of simplifying the structure of construction of the assembly of the inner and outer coreless motors.

What is claimed is:

1. A lens drive device comprising:
   (a) a barrel member;
   (b) zoom means having zoom lenses for performing a zooming operation;
   (c) focus means having a focusing lens for performing a focusing operation;
   (d) a motor for driving said zoom lenses and said focusing lens, said motor having a yoke having an outer yoke portion in contact with said barrel member and an inner yoke portion unified with said outer yoke portion, only one permanent magnet arranged between said outer yoke portion and said inner yoke portion, first and second field coils arranged respectively between said outer yoke portion and said permanent magnet and between said inner yoke portion and said permanent magnet, and power supply means for supplying electrical power to said first and said second field coils, whereby said outer yoke portion, said inner yoke portion and said permanent magnet form only one magnetic path for generating a rotation force for rotating said first and said second field coils; and (e) first and second rotors fixed to said first and said second field coils, and rotation force transmitting members connecting said first and second rotors to said zoom means and said focus means.

2. A device according to claim 1, wherein one of said first and second rotors is an inner rotor connected to said focus means and the other one of said first and second rotors is an outer rotor connected to said zoom means, wherein said inner rotor actuates said focus means and said outer rotor actuates said zoom means.

3. A device according to claim 1, wherein said zoom means includes a variator lens and a compensator lens.

4. A device according to claim 1, wherein one of said rotation force transmitting members connects said first rotor to said zoom means by a screw-threaded connection.

* * * * *

UNITED STATES PATENT AND TRADEMARK OFFICE
CERTIFICATE OF CORRECTION

PATENT NO. : 4,749,269

DATED : June 7, 1988

INVENTOR(S) : SHIGEO NAKASHIMA, ET AL.

It is certified that error appears in the above-identified patent and that said Letters Patent is hereby corrected as shown below:

COLUMN 1

Line 68, "electrrcal" should read --electrical--.

COLUMN 3

Line 18, "41aand" should read --41a and--.
Line 21, "paire" should read --paired--.
Line 51, "side." should read --side--.
Line 67, "an" should read --and--.

COLUMN 4

Line 32, "translater" should read --translates--.

Signed and Sealed this

Seventeenth Day of October, 1989

Attest:

DONALD J. QUIGG

Attesting Officer

Commissioner of Patents and Trademarks